(12) United States Patent
Engman

(10) Patent No.: US 11,934,208 B2
(45) Date of Patent: Mar. 19, 2024

(54) VARIABLE ORIFICE PROPORTIONER

(71) Applicant: Tyco Fire Products LP, Lansdale, PA (US)

(72) Inventor: James A. Engman, Marinette, WI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

(21) Appl. No.: 18/071,376

(22) Filed: Nov. 29, 2022

(65) Prior Publication Data

US 2023/0168698 A1 Jun. 1, 2023

Related U.S. Application Data

(60) Provisional application No. 63/284,082, filed on Nov. 30, 2021.

(51) Int. Cl.

| | |
|---|---|
| *G05D 11/02* | (2006.01) |
| *A62C 5/00* | (2006.01) |
| *A62C 5/02* | (2006.01) |
| *A62C 5/027* | (2006.01) |
| *G05D 11/00* | (2006.01) |
| *G05D 11/03* | (2006.01) |
| *G05D 11/13* | (2006.01) |

(52) U.S. Cl.
CPC ............. *G05D 11/02* (2013.01); *A62C 5/002* (2013.01); *A62C 5/02* (2013.01); *A62C 5/027* (2013.01); *G05D 11/03* (2013.01); *G05D 11/006* (2013.01); *G05D 11/135* (2013.01)

(58) Field of Classification Search
CPC ...... G05D 11/02; G05D 11/03; G05D 11/006; A62C 5/02; A62C 5/027; A62C 5/002; Y10T 137/2564; Y10T 137/2599

USPC .............................................. 137/111, 115.11
See application file for complete search history.

(56) References Cited

U.S. PATENT DOCUMENTS

| | | | | |
|---|---|---|---|---|
| 1,744,872 A | * | 1/1930 | Goodell | ............... G05D 7/0193 |
| | | | | 261/76 |
| 2,621,029 A | * | 12/1952 | Moseley | ................... F02M 1/00 |
| | | | | 137/481 |

(Continued)

FOREIGN PATENT DOCUMENTS

KR 20100104051 A * 9/2010 ............. A62C 27/00

OTHER PUBLICATIONS

Translation of KR-20100104051, Foreign Document Published 2010.*
UTU-POLY Shanghai TU-POLY Industrial Co., Ltd.; Thermal Actuators; Nov. 17, 2020; 15 Pages.

*Primary Examiner* — William M McCalister
(74) *Attorney, Agent, or Firm* — Foley & Lardner LLP

(57) ABSTRACT

A fire suppression system includes a water supply, a foam concentrate supply, and a venturi-principle foam proportioner fluidly coupled to each of the water supply and the foam concentrate supply. The venturi-principle foam proportioner controls a ratio of water and foam concentrate within a low pressure chamber to form a water and foam solution flowing out of the venturi-principle foam proportioner. The system also includes a variable foam concentrate orifice fluidly coupling the foam concentrate line to the low pressure chamber. The variable foam concentrate orifice includes an actuator configured to adjust an orifice area of the variable foam concentrate orifice based on a temperature of the foam concentrate.

20 Claims, 8 Drawing Sheets

(56) References Cited

U.S. PATENT DOCUMENTS

| | | | | |
|---|---|---|---|---|
| 3,817,264 A | * | 6/1974 | Kilayko | F16K 31/1268 |
| | | | | 251/61.3 |
| 4,336,820 A | * | 6/1982 | Jorgensen | G05D 11/03 |
| | | | | 137/100 |
| 4,357,953 A | * | 11/1982 | Patterson | B01F 35/1452 |
| | | | | 137/111 |
| 2007/0246230 A1 | * | 10/2007 | Roberts | A62C 5/02 |
| | | | | 169/14 |
| 2020/0230450 A1 | * | 7/2020 | Jonker | A62C 5/027 |
| 2023/0168698 A1 | * | 6/2023 | Engman | G05D 11/006 |
| | | | | 137/3 |

* cited by examiner

VARIABLE ORIFICE PROPORTIONER

CROSS-REFERENCE TO RELATED PATENT APPLICATION

This application claims the benefit of and priority to U.S. Provisional Application No. 63/284,082, filed Nov. 30, 2021, the entire disclosure of which is incorporated by reference herein.

BACKGROUND

The present disclosure relates generally to fire suppression systems. More specifically, the present disclosure relates to venturi-principle foam proportioning systems and devices.

Fire suppression systems often include proportioning mechanisms for introducing an additive, such as a foam concentrate, into a water stream. For each application proportioning mechanisms are designed to correctly meter and mix the foam concentrate into the water stream in specific proportions. The proportioning mechanisms are required to correctly proportion the foam concentrate over a wide range of temperatures for the fire suppression system to be effective.

SUMMARY

One aspect of the present disclosure relates to a fire suppression system. The system includes a water line configured to provide water from a water supply, a foam concentrate line configured to provide a foam concentrate from a foam concentrate supply, and a venturi-principle foam proportioner fluidly coupled to each of the water line and the foam concentrate line at respective first and second inlets. The venturi-principle foam proportioner is configured to control a ratio of a concentration of water and a concentration of foam concentrate within a chamber to form a water and foam solution flowing from an outlet of the venturi-principle foam proportioner. The system also includes a variable foam concentrate orifice disposed in the second inlet fluidly coupling the foam concentrate line to the low pressure chamber. The variable foam concentrate orifice includes an actuator configured to adjust an orifice area of the variable foam concentrate orifice based on a temperature associated with the foam concentrate.

In various embodiments, the variable foam concentrate orifice of the system includes a foam inlet fluidly coupled to the foam concentrate line and a variable orifice fluidly coupled to the foam inlet. The actuator substantially contains a first section of an actuable piston. A plate attached to an exposed end of the piston is movable by an actuator over the variable orifice to adjust the size of the variable orifice. When the temperature associated with the foam concentrate is below a minimum working temperature the plate is in a first position and a first orifice area is obtained, and when the temperature associated with the foam concentrate is at or above the minimum working temperature the actuator via the piston moves the plate over the variable orifice to a second position to adjust the size of the variable orifice and obtain a second orifice area. In some embodiments, the actuator is a thermostatic actuator thermally coupled to the foam concentrate line. In various embodiments, the thermostatic actuator includes an actuable piston comprising a first section positioned within a body of the actuator and a second section positioned outside the body of the actuator, a thermally sensitive material contained by the body of the actuator and a biasing member. The thermally sensitive material can be configured to expand when the temperature associated with the foam concentrate reaches a minimum working temperature, such that the first section of the piston is acted on by the expansion of the thermally sensitive material when temperature associated with the foam concentrate is at or above the minimum working temperature and a portion of the first section is pushed out of the body of the actuator, and such that the biasing member biases the piston in a direction back into the body of the actuator.

In various embodiments, the actuator is an electric actuator. In some embodiments, the variable foam concentrate orifice includes a temperature sensor thermally coupled to the foam concentrate line to sense the temperature associated with the foam concentrate. The electric actuator is communicably coupled to the temperature sensor and can actuate when the temperature associated with the foam concentrate reaches a first temperature. In various embodiments, the foam concentrate has a viscosity that is correlated with a temperature of the foam concentrate, and the actuator can increase the orifice area of the variable orifice as the viscosity of the foam concentrate increases based on the temperature associated with the foam concentrate. In some embodiments, the foam concentrate has a viscosity that increases as the temperature of the foam concentrate increases. In some embodiments, the foam concentrate has a viscosity that decreases as the temperature of the foam concentrate increases.

Another aspect of the present disclosure relates to a method of proportioning a foam concentrate in a fire suppression system. The method includes providing water from a water supply to a venturi-principle foam proportioner and providing a foam concentrate from a foam concentrate supply to the venturi-principle foam proportioner, the viscosity of the foam concentrate being correlated with a temperature of the foam concentrate, and forming, by the venturi-principle foam proportioner, a foam using the water and the foam concentrate according to a desired ratio. The method further includes sensing the temperature of the foam concentrate and adjusting, by an actuator, an orifice area of the venturi-principle foam proportioner based on the temperature of the foam concentrate to maintain the desired ratio.

This summary is illustrative only and should not be regarded as limiting.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting. While the description below refers to additives as foam concentrates and to foam systems as fire suppression systems, the description is applicable to any proportioning system that requires the metered addition of any additive to a fluid stream.

As firefighting foam concentrates, including fluorinated and non-fluorinated technologies evolve, the physical properties of the foam concentrates are also changing. Due to new materials, compositions, and concentrations, these foam concentrates exhibit a wide range of viscosities over a desired operational temperature range. Venturi-principle proportioning mechanisms rely on the flow of water through a venturi to create an area of low pressure that allows a predetermined amount of foam concentrate maintained at a higher pressure (e.g., atmospheric pressure) to enter the system and mix with the water stream. Proportioning mechanisms are carefully designed to ensure a proper amount of foam concentrate is metered over the anticipated operating range of temperatures and flow rates. The changing viscosities of the firefighting foam concentrates can affect the amount of concentrate metered into a water stream by the venturi. Firefighting foams that are especially viscous at certain temperatures may even need to be restricted to smaller operating ranges where they are less viscous to allow for proper proportioning by a venturi-principle mechanism. Accordingly, there is a need in the art for improved venturi-principle foam concentrate proportioning mechanisms and systems capable of proportioning foam concentrates over a wider range of viscosities.

Figure 1:
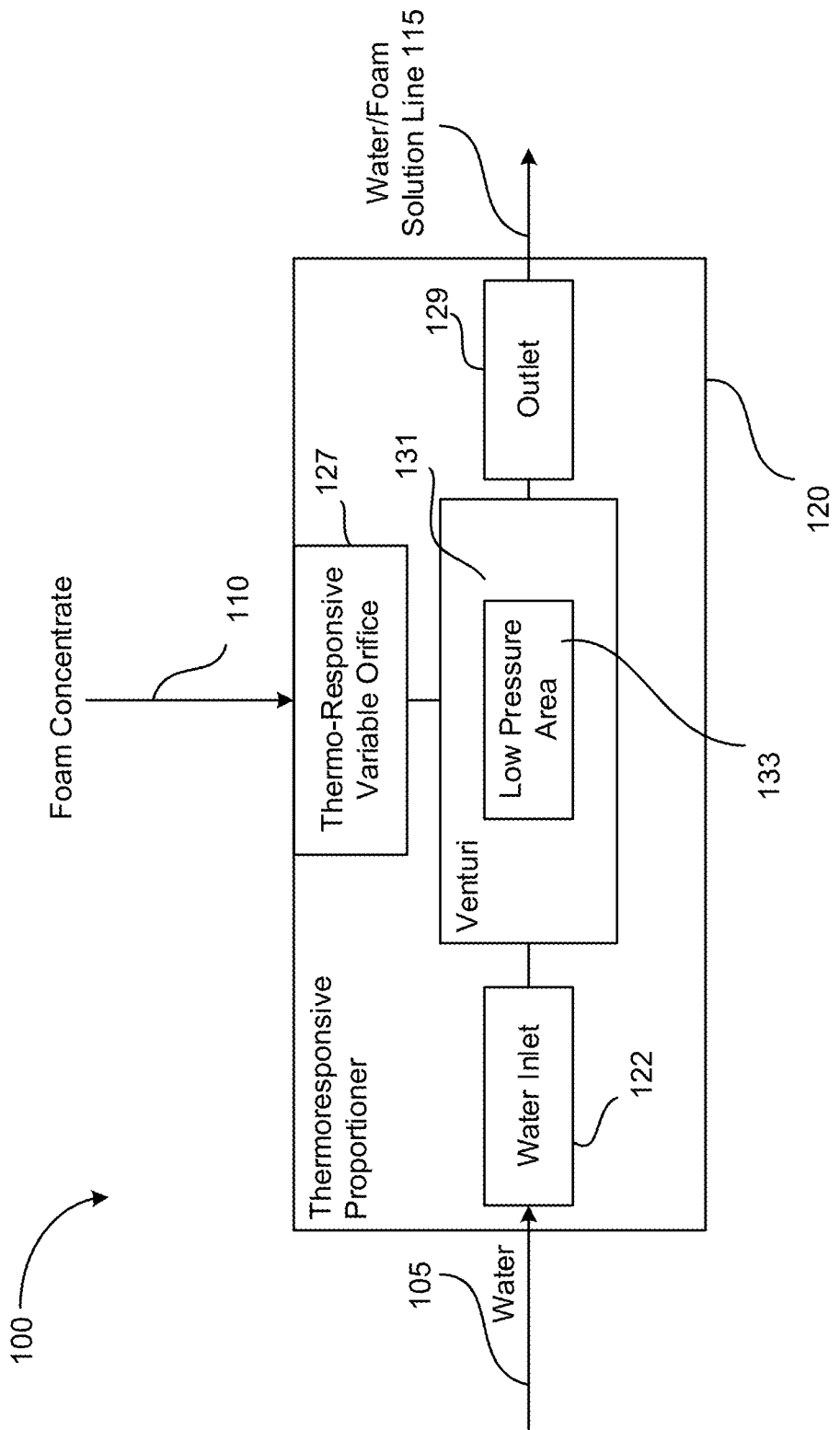
FIG. 1 is a block diagram of a fire suppression system with a thermo-responsive variable orifice foam proportioner, according to an exemplary embodiment.

Referring to FIG. 1, a fire extinguishing or suppression system 100 is shown. The system 100 is configured to address (e.g., extinguish, suppress, etc.) one or more fires within, on, or nearby a structure or area (e.g., building, residence, storage unit, etc.) within which the system 100 is located. The system 100 may use a venturi-principle foam proportioner to mix foam concentrate (e.g., fluorinated or non-fluorinated foam concentrate) with a flow of water to produce a water and foam solution, which may be discharged by the system 100 to address one or more fires. The foam concentrate may be supplied at atmospheric pressure and paired with a high pressure water supply, which when flowing through the venturi-principle foam proportioner draws foam concentrate into the proportioner to make a finished foam. As shown, the system 100 includes a water line 105, which is fluidly connected with a foam concentrate line 110 and a water/foam solution line 115 via a venturi-principle foam proportioner 120. The water line 105 receives water from a water supply (e.g., water supply conduits within the structure, a water reservoir, a pressurized water supply, etc.).

The venturi-principle foam proportioner 120 receives water from the water line 105 at a water inlet 122 and receives foam concentrate from the foam concentrate line 110 through a thermo-responsive variable orifice 127. The venturi-principle foam proportioner 120 is configured to meter at least one of an amount of water through the water inlet 122 or an amount of foam concentrate through the thermo-responsive variable orifice 127 into a venturi 131. In some embodiments, the venturi-principle foam proportioner 120 proportions foam at a designed or predetermined ratio. The ratio can be selected based on the application of the system 100, the operating characteristics of the water supply, and/or the pressure requirements of the system.

The diameter of venturi 131 decreases along the flow path of the water passing through the venturi 131 toward a constriction. Due to the decreased diameter, the velocity of the water increases to maintain a constant rate of flow. This in turn reduces the pressure of the water in the venturi 131 and creates a low pressure area 133. The pressure differential between the low pressure area 133 and the foam concentrate line 110 draws foam concentrate from foam concentrate line 110 through thermo-responsive variable orifice 127 and into low pressure area 133. Downstream from the low pressure area 133, the diameter of venturi 131 increases to outlet 129, and the fluid leaving the constriction slows and the fluid pressure correspondingly increases.

The amount of foam concentrate drawn into low pressure area 133 of venturi 131 is related to multiple factors including the flow rate of water in water line 105, the pressure of foam concentrate line 110, the flow rate of foam concentrate in foam concentrate line 110, the viscosity of foam concentrate in foam concentrate line 110, and the size of the thermo-responsive variable orifice 127.

In one embodiment, the size (e.g., area) of the thermo-responsive variable orifice 127 in system 100, and thus the amount of foam concentrate flowing into low pressure area 133, is adjusted (e.g., automatically) based on the temperature of the foam concentrate. For many foam concentrates, the viscosity of the foam concentrate varies based on temperature. Accordingly, in order to maintain a desired water/foam ratio across the operating temperature range (and corresponding viscosity curve) of the foam concentrate, the venturi-principle foam proportioner 120 accounts for changes in viscosity by adjusting the size of the thermo-responsive variable orifice 127 based on the temperature. For example, for foams that decrease in viscosity as the temperature increases, the size of the thermo-responsive variable orifice 127 can decrease as temperature rises. The change in the size of the thermo-responsive variable orifice 127 at a given temperature, for example a minimum working temperature, can be proportional to the change in the viscosity of the foam concentrate at that temperature such that the total flow of foam concentrate from thermo-responsive variable orifice 127, and therefore the water/foam ratio, is maintained at an approximately constant level for a given flow rate of water, despite any change in temperature and viscosity of the foam concentrate. Accordingly, still referring to the example above, as the viscosity of the foam concentrate decreases and the foam concentrate flows more freely, the size of the thermo-responsive variable orifice 127 also decreases, thereby ensuring an approximately constant foam/water ratio in venturi 131. Relatedly, for foams that increase in viscosity as the temperature increases, the size of the thermo-responsive variable orifice 127 can increase as the temperature rises to account for the increased resistance to flow of the more viscous foam concentrate. In some embodiments, the venturi-principle foam proportioner 120 with the thermo-responsive variable orifice 127 is capable of proportioning foams having a viscosity up to 3000-3500 centipoise (cP). In other embodiments, the venturi-principle foam proportioner 120 can handle foam concentrates having a viscosity up to 10,000 cP.

Having proportioners adjust for changes in temperature and viscosity is beneficial for foam proportioners as more and more they may be required to proportion new foams with large changes in viscosity over desired operating temperature ranges. In some embodiments, the temperature range is 35° F.-120° F. Still in other embodiments, the temperature range can be larger, for example −20° F.-140° F. As discussed above, certain foams with otherwise desirable fire suppression characteristics may have such high viscosities at temperatures at one of the extremes of the above ranges that properly proportioning the foam concentrate at such temperatures without accounting for the change in viscosity can be difficult. For example, for some foam concentrates the temperature-viscosity curve is logarithmic at lower temperatures, and a foam proportioner designed to meter a first volume of a less viscous foam concentrate at a first temperature into venturi 131 to obtain a desired ration in a water/foam solution may be unable to properly portion the foam at a lower second temperature when it is more viscous.

The venturi-principle foam proportioner 120 can be designed to meter a set proportion of foam concentrate using the thermo-responsive variable orifice to fit a specific application. In some embodiments, the venturi-principle foam proportioner 120 can be configured to proportion a water/foam solution of 1%, 2%, 3%, and 6% (1% being 1 part foam concentrate to 99 parts water, etc.), however the venturi-principle foam proportioner 120 can be configured to meter a water/foam concentrate according to various other concentrations as well. The metered water/foam solution is then expelled through an outlet 129 at the known or predetermined water/foam ratio. Although, venturi-principle foam proportioners are typically designed to minimize a drop in pressure across the venturi 131, in most cases, there is a non-zero pressure drop between the inlets and outlets. In various implementations the pressure drop across venturi-principle foam proportioner 120 may increase or decrease based on at least one of a flow through the water inlet 122 or a flow through the thermo-responsive variable orifice 127. In various embodiments, the system 100 may include more or fewer pressure sensor gauges. For example, the system 100 may be designed to operate without pressure gauges on water inlet 122, foam concentrate line 110 and water/foam solution line 115.

As described above, the venturi-principle foam proportioner 120 may be a line proportioner, and the system 100 may maintain the foam concentrate line 110 at atmospheric pressure. Line proportioners are used in fire suppression systems where the available pressure in the water line 105 is high enough that the water/foam solution line pressure will be sufficiently high despite the pressure drop across the venturi-principle foam proportioner 120. Still in other embodiments the venturi-principle foam proportioner 120 is a dual-function variable orifice proportioner configured to adjust the thermo-responsive variable orifice 127 according to both the flow rate in the venturi 131 and the temperature of the foam concentrate in foam concentrate line 110 as described above. The dual-function variable orifice proportioner can include a deflector positioned within the venturi 131 and coupled to the thermo-responsive variable orifice 127. The flow of water across the deflector causes the deflector to deflect and adjust the size of the variable orifice in addition to any adjustments made by the thermo-responsive variable orifice 127 due to the temperature of the foam concentrate. As the flow rate increases, the deflection increases, and so does the size of the variable orifice.

Flow through the system 100, and thus a concentration of the water/foam solution through the water/foam solution line 115 may be, at least in part, based on at least one of a diameter of the venturi-principle foam proportioner 120 outlet 129. For example, the venturi-principle foam proportioner 120 may have a 4 inch diameter at outlet 129, which allows for approximately 750 gallons per minute (gpm) of flow through the water/foam solution line 115. If the venturi-principle foam proportioner 120 causes a pressure drop of 5 psi, the system 100 may be controlled such that a flow through the foam concentrate line 110 is 22.5 gpm, which results in the water/foam solution within the water/foam solution line 115 having approximately 3% foam concentrate by volume.

Figure 3:
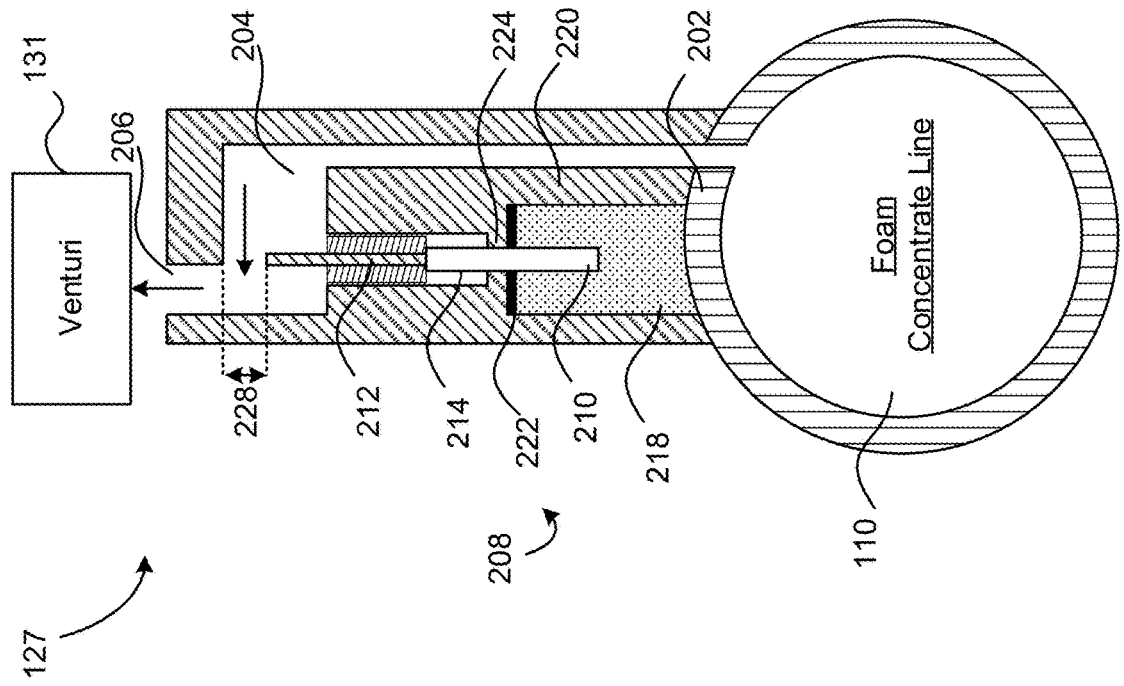
FIGS. 2 and 3 are cross-section views of a portion of the thermo-responsive variable orifice foam proportioner of FIG. 1 at a first time and at a second time respectively, according to an exemplary embodiment.
Figure 2:
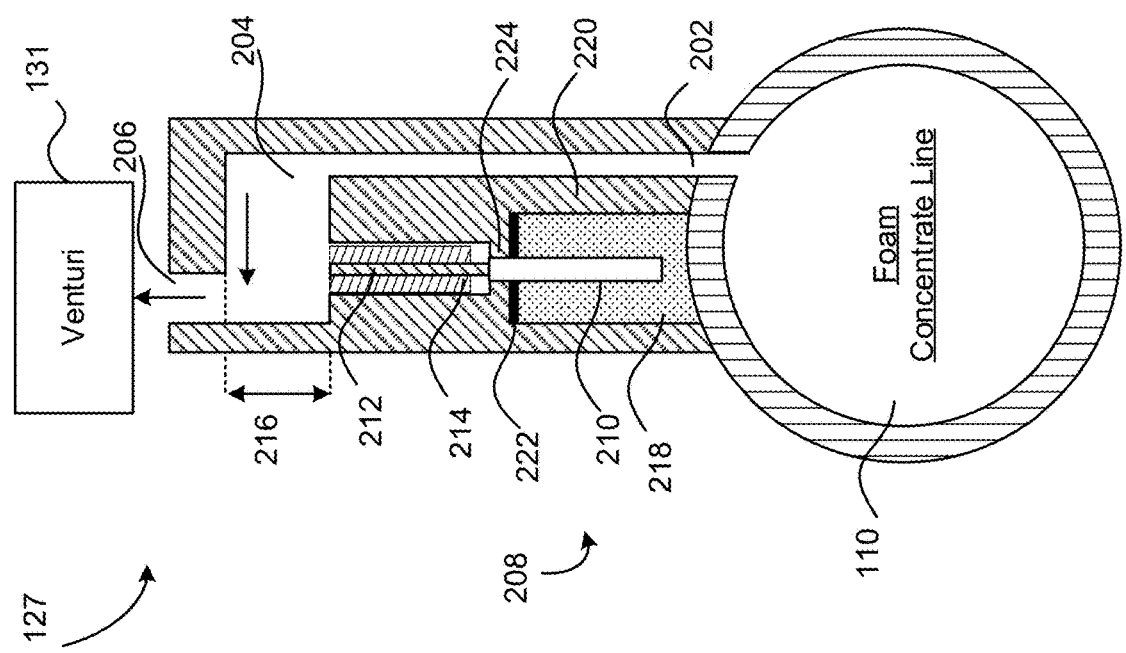

Referring now to FIGS. 2 and 3, cross-sections of a thermo-responsive variable orifice 127 of the venturi-principle foam proportioner 120 are shown, according to an exemplary embodiment. In some embodiments, the thermo-responsive variable orifice 127 of FIGS. 2 and 3 is configured to operate with foam concentrates that increase in viscosity as their temperature decreases. As a temperature of the foam concentrate in the foam concentrate line 110 increases and the viscosity of the foam concentrate decreases, the thermo-responsive variable orifice 127 is configured to decrease an orifice area, shown as orifice area and orifice area 228. As shown in FIGS. 2 and 3, the thermo-responsive variable orifice 127 includes a foam inlet 202, which fluidly couples foam concentrate line 110 to a variable orifice 204 located downstream of the foam concentrate line 110. The variable orifice 204 is fluidly coupled to venturi 131 of FIG. 1 by the foam outlet 206. In some embodiments, the diameters of foam inlet 202, variable orifice 204 (at its maximum size) and foam outlet 206 are equal. The fluidly coupled foam inlet 202, variable orifice 204, and foam outlet 206 are configured to form a flow path to enable a flow of foam concentrate from foam concentrate line 110 to venturi 131. Flow within the flow path may be controlled by actuator 208, which may be mechanically, hydraulically, or electrically actuated. Actuator 208 includes an actuable piston 210 attached to a plate 212. Upon actuation of actuator 208, piston 210 travels away from foam concentrate line 110 and towards foam outlet 206, pushing plate 212 into variable orifice 204. The plate 212 is configured to block a portion of variable orifice 204 such that an orifice area (e.g., 216, 228) of variable orifice 204 is reduced. The orifice area is the total amount of area foam concentrate is able to pass through variable orifice 204 from foam inlet 202 to foam outlet 206. When piston 210 is retracted by actuator 208 a biasing device coupled to piston 210, shown as spring 214, pushes piston 210 back towards foam concentrate line 110, however it should be understood than any other mechanism capable of returning piston 210 and plate 212 to their previous position in the actuator 208's unactuated position can be used. After spring 214 pushes the piston down the portion of plate 212 blocking variable orifice 204 is reduced and the orifice area of the variable orifice 204 is increased.

In some embodiments, the actuator 208 is an electric actuator. An electric temperature sensor (e.g., thermistor, thermocouple, resistance temperature detector, semiconductor based IC, etc.) is thermally coupled to the foam concentrate line 110 and configured to provide a temperature output associated with a temperature of the foam concentrate to actuator 208 via an electrical coupling such as a wire. Actuator 208 may be configured to actuate and move piston 210 when the foam concentrate temperature is at or above actuation temperature. In some embodiments, the actuation temperature is based on the temperature-viscosity curve of a foam concentrate selected for use in system 100.

Referring back to FIGS. 2 and 3, actuator 208 is shown as a thermostatic actuator 208. Thermostatic actuator 208 includes a thermally sensitive material, shown as thermal wax element 218 contained by a casing 220. The thermal wax element 218 is in some embodiments a thermal wax configured to expand at a designed minimum working temperature, however other thermally sensitive materials can be used provided they are capable of accurate temperature sensing and control. As shown in FIGS. 2 and 3, the thermostatic actuator 208 is a plunger-piston type. In some embodiments, the thermostatic actuator 208 may be of another type (e.g., squeeze-push type, diaphragm type, etc.). A lower portion of the piston 210 is substantially contained in the thermal wax element 218. In some embodiments, a sealing ring 222 is disposed at a top of the thermal wax element 218 and around piston 210 for containing the thermal wax element 218. A guide 224 keeps the piston 210 moving in or along a substantially constant direction. Once the thermal wax element 218 is at or exceeds a minimum working temperature, the thermal wax element 218 expands and acts on the portion of the piston 210 contained within the thermal wax element 218, pushing the piston 210 and the plate 212 at least a first distance outside of the thermal wax element 218. In some embodiments, as the temperature of the foam concentrate falls below the minimum working temperature, a biasing member, shown as spring 214, is provided to return plate 212 and, accordingly, piston 210 to the original position in the unactuated state of actuator 208. The stroke of actuator 208 is the maximum displacement of the piston 210 from a first position to an extended position at a minimum working temperature. In some embodiments, the minimum working temperature and stroke of actuator 208 are designed based on the temperature-viscosity curve of a selected foam concentrate, such that the piston 210 moves plate 212 to achieve one or more set orifice areas at one or more temperatures appropriate to account for corresponding changes in the viscosity of the foam concentrate at the corresponding temperatures. In some embodiments, the thermo-responsive variable orifice 127 is a multi-action thermo-responsive variable orifice and includes two or more actuators providing two or more stages of actuation to the thermo-responsive variable orifice 127. For example, a first actuator may have a minimum working temperature of 45° F. and a second actuator may have a minimum working temperature of 80° F. As the temperature of the foam concentrate in foam concentrate line 110 increases, the first minimum working temperature of the first actuator is reached first and the actuator 208 moves the plate 212 to a first position to ensure a proper proportion of water/foam in the venturi 131. As the temperature of the concentrate increases again, the minimum temperature of the second actuator may be reached and a second actuator moves plate 212 to a second position. Still in other embodiments, the thermo-responsive variable orifice 127 may contain a single actuator 208 configured with two or more actuation stages.

For example, referring to FIG. 2, the thermo-responsive variable orifice 127 is shown at a first time T1 with the foam concentrate in foam concentrate line 110 at a first temperature below a minimum working temperature of the thermostatic actuator 208. At T1 thermostatic actuator 208 is in an unactuated state and the orifice area is a first area orifice area 216. A substantial portion of piston 210 is contained by actuator 208 and plate 212 is shown in a first position not extended into variable orifice 204. In yet other implementations an upper portion of plate 212 may partially extend into variable orifice 204 even when actuator 208 is in an unactuated state. As discussed above, at time T1, the foam concentrate in foam concentrate line 110 has a first temperature and a corresponding first viscosity. A first volume of foam concentrate from foam concentrate line 110 travels through foam inlet 202 and orifice area 216 of variable orifice 204, before passing through foam outlet 206 and into venturi 131.

Referring to FIG. 3, the thermo-responsive variable orifice 127 is shown at a second time T2 with the foam concentrate in foam concentrate line 110 at a second temperature, where the second temperature is greater than the first temperature. As shown, the orifice area 228 is smaller than orifice area 216 of FIG. 2. In some embodiments, at T2 the second temperature is greater than a minimum actuator temperature of thermostatic actuator 208 disposed within the thermo-responsive variable orifice 127. As described above, the viscosity of foam concentrates can vary according to their temperature. Accordingly, the thermo-responsive variable orifice 127 may be designed to adjust the orifice area 228 based on a selected foam concentrate's temperature-viscosity curve. For example, thermo-responsive variable orifice 127 may be configured to adjust the orifice area from a first orifice area to a second orifice area at 45° F., however the thermo-responsive variable orifice can be set to actuate at any temperature to account for the changing viscosity of a foam concentrate. Still in other embodiments, the thermo-responsive variable orifice 127 adjusts the orifice area using a continuous process, wherein the actuator 208 is constantly adjusting the position of piston 210 and plate 212 based on a temperature of the foam concentrate in the foam concentrate line.

Still referring to FIG. 3, as described above at T2 the thermo-responsive variable orifice 127 is at a second temperature greater than a minimum working temperature of the thermostatic actuator 208. Accordingly as shown in FIG. 3 thermostat actuator 208 is illustrated in an actuated state. The thermal wax element 218 is expanded and piston 210 is pushed from the thermal wax element 218 through sealing ring 222, wherein the spring 214 is compressed and plate 212 is forced into variable orifice 204 a first distance such that the orifice area 228 is reduced as compared to the orifice area 216 at T1 in FIG. 2. The change in size of orifice area 216 from T1 to orifice area 228 of T2 is designed such that a total flow of concentrate from foam outlet 206 (at a given system flow rate in water line 105) is substantially constant across the operating temperature range of the system 100.

Figure 5:
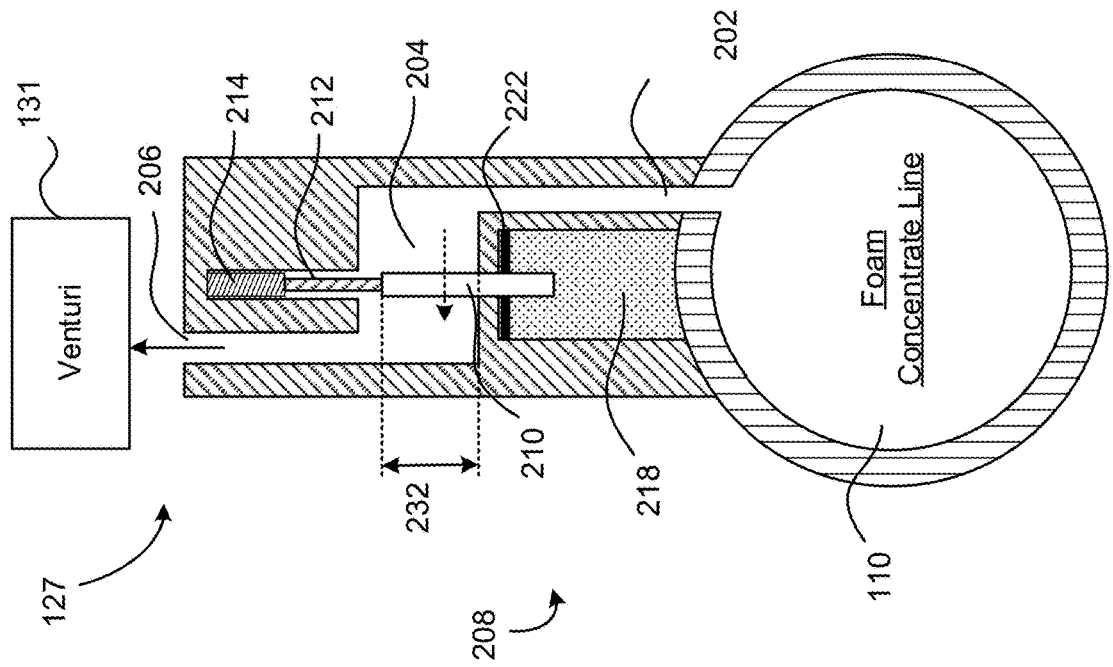
FIGS. 4 and 5 are cross-section views of a portion of the thermo-responsive variable orifice foam proportioner of FIG. 1 at a first time and at a second time respectively, according to another exemplary embodiment.
Figure 4:
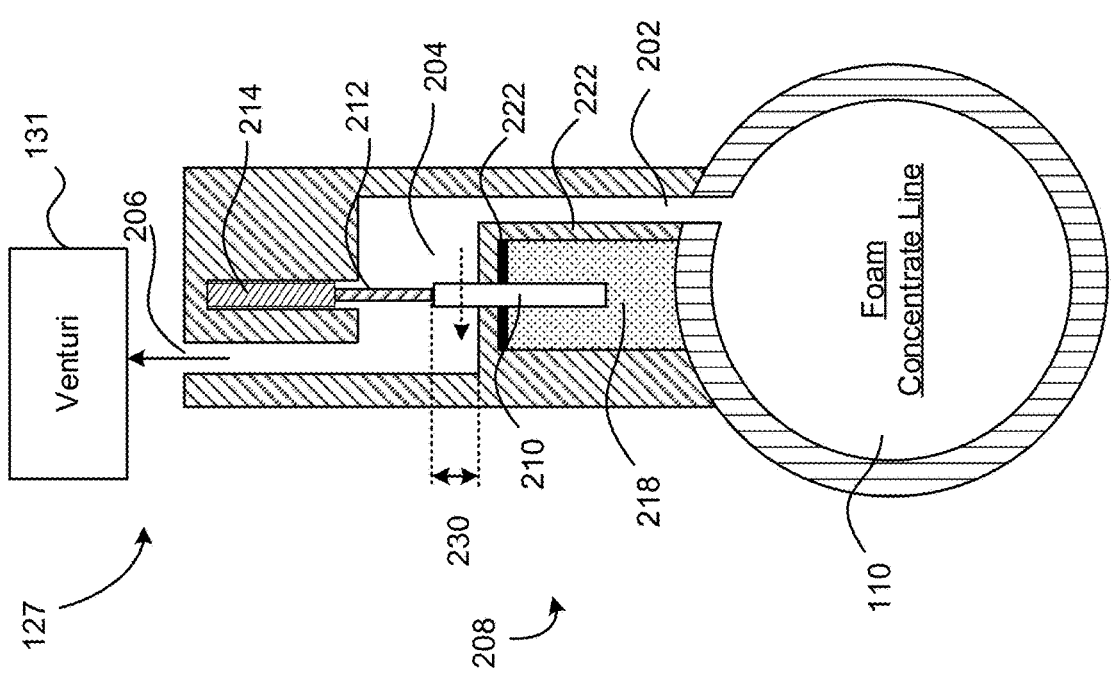

Referring now to FIGS. 4 and 5, cross-sections of a thermo-responsive variable orifice 127 of the venturi-principle foam proportioner 120 are shown, according to another exemplary embodiment. As opposed to FIGS. 2 and 3, the thermo-responsive variable orifice 127 of FIGS. 4 and 5 is configured to operate with foam concentrates that increase in viscosity as their temperatures increase. The foam concentrates may include non-fluorinated foams, aqueous film-forming foam, polymerized foams, etc. As a temperature of the foam concentrate line 110 increases, the thermo-responsive variable orifice 127 is configured to increase the orifice area. When in a first state represented by FIG. 4, the actuator 208 is unactuated and the orifice area 230 is at a first area. Foam concentrate flows from the foam concentrate line 110 through foam inlet 202 into the variable orifice 204. At the variable orifice 204 the foam concentrate flows around the piston 210 and through the orifice area 230 to the foam outlet 206, and then flows to the venturi 131 shown in FIG. 1.

At a second state represented by FIG. 5, the temperature of the foam concentrate in the foam concentrate line 110 is above the working temperature, and the actuator is represented in an actuated state. The thermal wax element 218 is expanded and piston 210 is partially pushed from the thermal wax element 218 such that the orifice area is expanded such that orifice area 232 is greater than the orifice area 230 of FIG. 4. In some embodiments, the change in size from orifice area 230 to orifice area 232 is based on the temperature-viscosity curve of a selected foam concentrate, such that the piston 210 moves plate 212 to achieve one or more set orifice areas at one or more temperatures appropriate to account for the increase in the viscosity of the foam as the temperature increases. In some embodiments, at a time T3 when a temperature of the thermo-responsive variable orifice 127 falls below the minimum working temperature of the thermal wax element 218, the thermal wax element contracts and spring 214 pushes plate 212 and piston 210 back into their unactuated positions as represented by FIG. 4.

Figure 6:
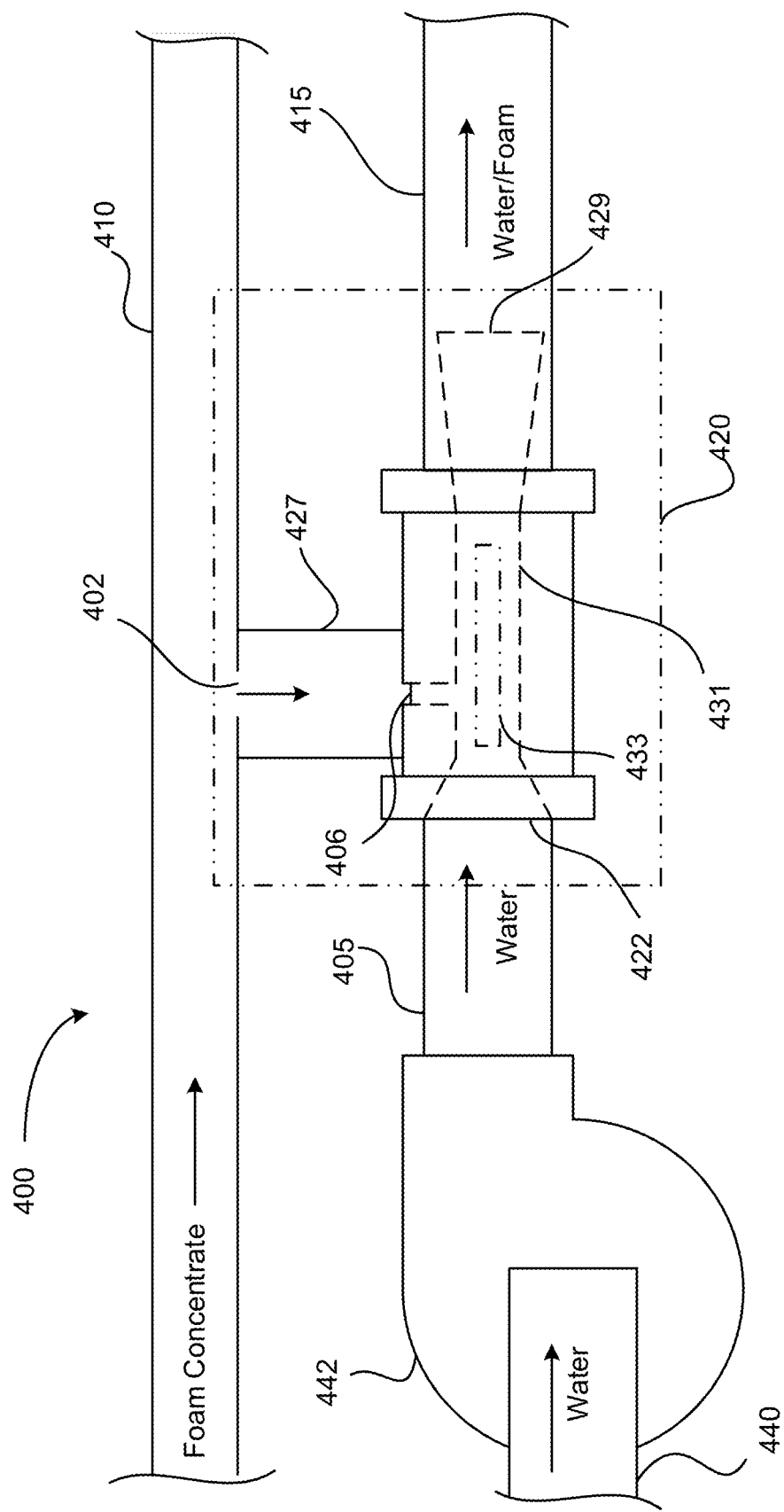
FIG. 6 is a schematic representation of a fire suppression system with a thermo-responsive variable orifice foam proportioner, according to an exemplary embodiment.

FIG. 6 shows a schematic of fire suppression system 400, which includes a venturi-principle foam proportioner with a thermo-responsive variable orifice, according to an exemplary embodiment. In various embodiments, elements 405 and 410-433 of the system 400 are similar or equivalent to elements 105-133 of the system 100, respectively, and elements 402 and 406 are similar to or equivalent to elements 202 and 206 of thermo-responsive variable orifice 127, respectively. As shown in FIG. 6, the system 400 includes a water source, shown as water source 440, coupled to a pump 442 configured to pump water through water line 405 of system 400. Foam concentrate line 410 is fluidly coupled to the venturi-principle foam proportioner 420 via foam inlet 402. Foam inlet 402 provides foam concentrate to thermo-responsive variable orifice 427. Thermo-responsive variable orifice 127 is thermally coupled to foam concentrate line 410 and configured to adjust an internal variable orifice based on the temperature of the foam concentrate line 410. Foam concentrate passes through the thermo-responsive variable orifice 427 and is provided to venturi 431 via a foam outlet 406 positioned at a bottom of the thermo-responsive variable orifice 427. In some embodiments, the foam outlet 406 is a second variable outlet configured to be adjusted by a deflector plate positioned in venturi 431 based on the velocity of the water in the venturi 431.

Still referring to FIG. 6, foam concentrate is drawn through from foam concentrate line 110 and through foam inlet 402, thermo-responsive variable orifice 427, and foam outlet 406 because of low pressure area 433. Low pressure area 433 is generated by venturi 431 as a first diameter of venturi 431 decreases from a water inlet 422 to the low pressure area 433, causing the water to increase in velocity, and therefore causing a corresponding drop in a pressure of the water. The pressure differential from low pressure area 433 and foam concentrate line 410 forces foam concentrate into venturi 431. Venturi 431 generates a water/foam solution that flows through outlet 429. A second diameter of venturi 431 expands from low pressure area 433 to outlet 429 such that the velocity of the water/foam solution decreases and the pressure increases. The water/foam solution then flows through water/foam line 415 and into the remainder of system 400 for application to one or more hazards.

Figure 7:
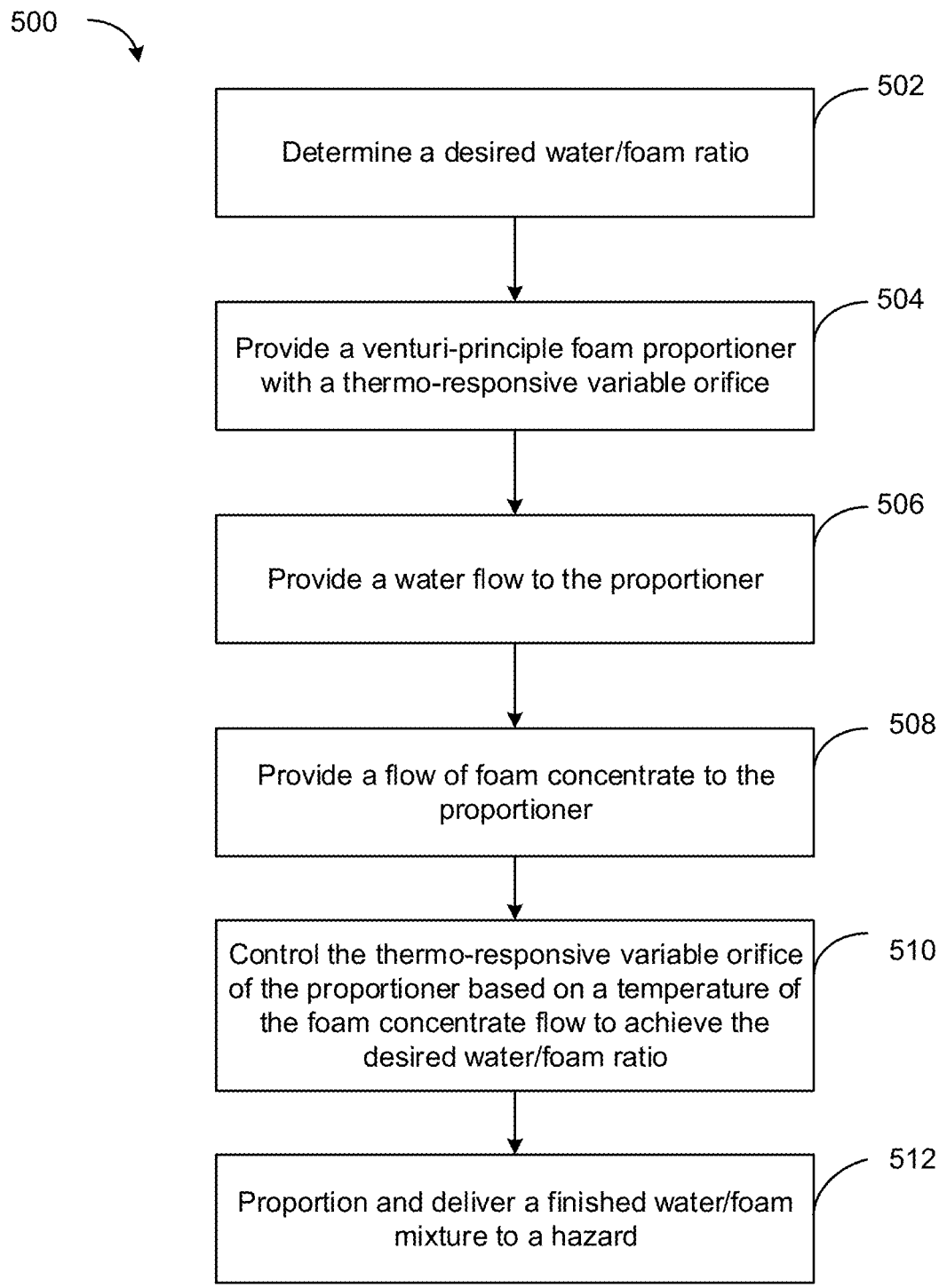
FIG. 7 is a flow diagram of a method of proportioning a foam concentrate using a thermo-responsive variable orifice foam proportioner, according to an exemplary embodiment.

FIG. 7 is a flow diagram of a process 500 for proportioning a foam concentrate using a thermo-responsive variable orifice foam proportioner, according to an exemplary embodiment. In some embodiments, the process relates to proportioning a foam concentrate using a thermo-responsive variable orifice foam proportioner and includes the steps of: a) determining a desired water/foam ratio 502; b) providing a venturi-principle foam proportioner with a thermo-responsive variable orifice 504; c) providing a flow of water to the proportioner 506; d) provide a flow of foam concentrate to the proportioner 508; e) controlling the thermo-responsive variable orifice of the proportioner based on a temperature of the foam concentrate flow 510 to achieve the desired water/foam ratio; and f) proportioning and delivering a finished water/foam mixture to a hazard.

Referring further to FIG. 7, the water/foam ratio may be determined (502). The water/foam ratio may be determined based on an application of the fire suppression system and account for factors including system pressure, system flow, foam concentrate viscosity, operating temperature range, and/or other factors.

In some embodiments, a venturi-principle foam proportioner with a thermo-responsive variable orifice is provided (step 504). In various embodiments, the venturi-principle foam proportioner is the same or similar to the venturi-principle foam proportioner 120 of FIGS. 1-5 and/or the venturi-principle foam proportioner 420 of FIG. 6. In various embodiments, the thermo-responsive variable orifice is the same or similar to the thermo-responsive variable orifice 127 of FIGS. 1-5 and/or the thermo-responsive variable orifice 427 of FIG. 6. As described above, the thermo-responsive variable orifice includes a thermostatic actuator thermally coupled to a foam concentrate line containing the foam concentrate flow and configured to adjust a variable orifice based on the temperature of the foam concentrate flow. Other types of actuators can be used provided they are capable of adjusting the variable orifice based on a sensed temperature of the foam concentrate flow.

In some embodiments, the venturi-principle foam proportioner is provided a water flow (506). In various embodiments, the water flow is provided by a water line that is the same or similar to the water line 105 of FIGS. 1-5 and the water line 405 of FIG. 6. The water flow may be provided by a pump disposed before the proportioner and configured to provide water at a set flow rate. In some embodiments, the venturi-principle foam proportioner is provided a foam concentrate flow (508). In various embodiments, the foam concentrate flow is provided by a foam concentrate line that is the same or similar to the foam concentrate line 110 of FIGS. 1-5 and the foam concentrate line 410 of FIG. 6. The foam concentrate flow can be provided at atmospheric pressure levels.

In some embodiments, the thermo-responsive variable orifice is controlled based on a temperature of the foam concentrate flow to achieve the desired water/foam ratio (step 510). As described above, the viscosity of a foam concentrate may vary as the temperature of the foam concentrate changes. To proportion the variable-viscosity foam concentrate across a wide range of operating temperatures, the thermo-responsive variable orifice, using a temperature of the foam concentrate flow as a proxy for the viscosity of the foam concentrate flow, can adjust the size of a variable orifice to account for the changing viscosity of the foam concentrate flow. For example, a temperature-viscosity curve for a selected foam concentrate can be obtained, and a thermo-responsive variable orifice designed such that an actuator of the thermo-responsive variable orifice is configured to change the size of the variable orifice proportionally to the change in the viscosity of the foam concentrate such that the total amount of foam concentrate metered from the thermo-responsive variable orifice is substantially constant across temperatures and viscosities.

The thermo-responsive variable orifice can include a thermostatic actuator containing a thermal wax element configured to expand at a minimum working temperature. The thermostatic actuator contains a piston disposed in the thermal wax element configured to slidably move between a first position and a second position. In some embodiments, the piston is attached to a plate, and the plate is partially disposed in a variable orifice of the thermo-responsive variable orifice and configured to adjust an orifice area of the variable orifice. The size of the orifice area is controlled by the position of the plate, and correspondingly the position of the piston and the state of the thermostatic wax element. Still in other embodiments the thermo-responsive variable orifice can include another type of actuator (e.g., hydraulic, electric, etc.).

In some embodiments, a finished water/foam mixture is proportioned and delivered to a hazard (step 512). The finished water/foam mixture has a water/foam ratio according to the desired ratio determined at step 502. In some embodiments, the finished water/foam mixture is provided to a pump (e.g., an around-the-pump system) before being delivered to a hazard.

Figure 8:
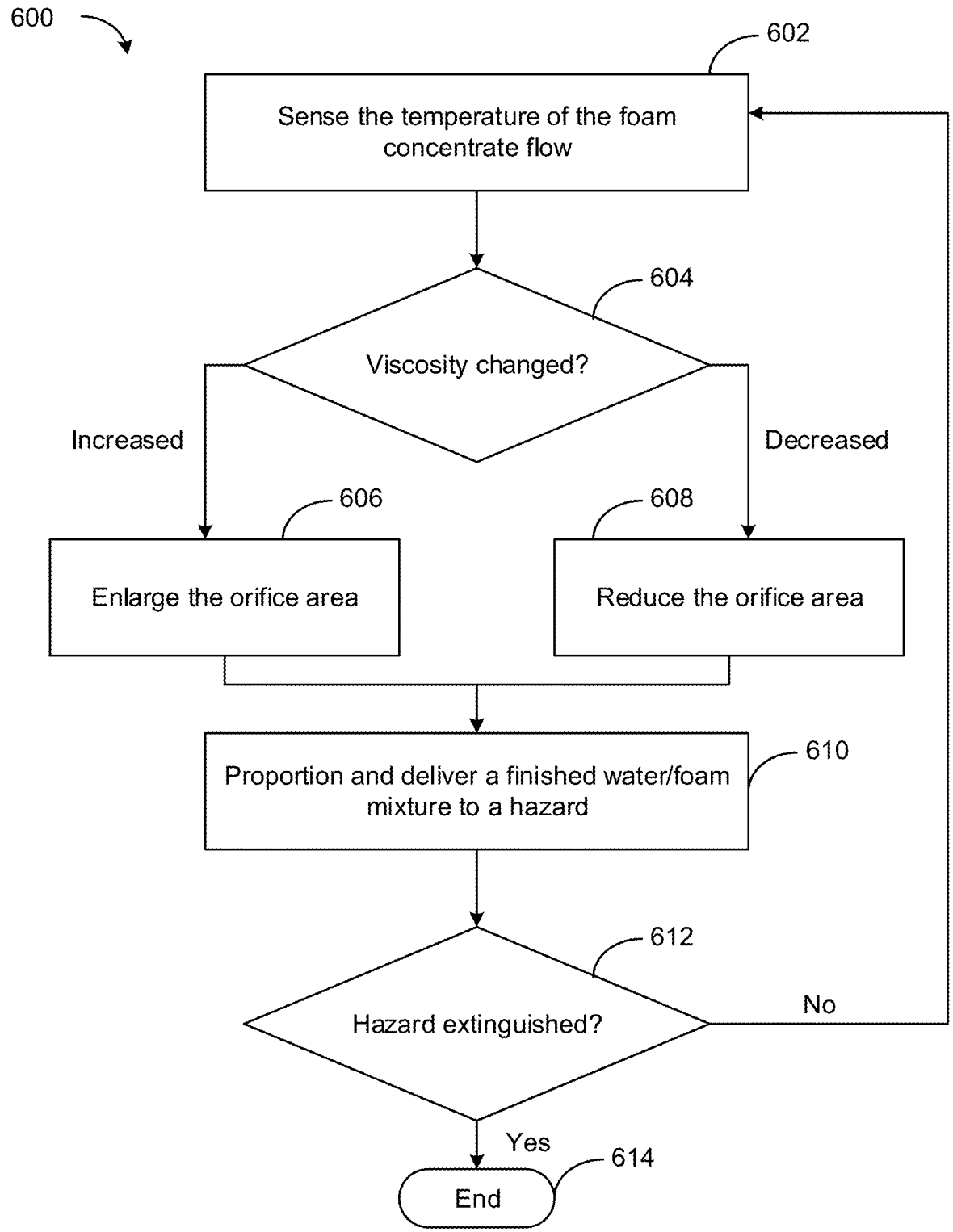
FIG. 8 is a flow diagram of a method for controlling a variable orifice of a thermo-responsive variable orifice foam proportioner of FIG. 1, according to an exemplary embodiment.

Referring now to FIG. 8, a flow diagram of a process 600 for controlling a variable orifice of thermo-responsive variable orifice of FIG. 1 is shown, according to an exemplary embodiment. In some embodiments the process of FIG. 8 is the same or similar to step 510 of process 500. In some embodiments the process includes: a) sensing the temperature of a foam concentrate flow 602; b) sensing if the viscosity of the foam concentrate flow has changed 604; c) if the viscosity has increased, enlarging the orifice area 606; d) if the viscosity has decreased, reducing the orifice area 608; e) proportioning and delivering a finished water/foam mixture to hazard 610; f) checking if the hazard is extinguished 612; g) if the hazard is not extinguished, returning to step 602; h) if the hazard is extinguished, the method ends 614.

In some embodiments, the temperature of the foam concentrate flow is sensed (step 602). The actuator in the thermo-responsive variable orifice may be a thermostatic actuator including a thermal wax element. The thermal wax element is thermally coupled to the foam concentrate line and configured to sense the temperature of the foam concentrate flow by converting the heat energy of the foam concentrate into mechanical energy at a designed minimum working temperature. In other embodiments other methods of sensing temperature can be used (e.g., other thermally sensitive materials, electric temperature sensors, etc.).

In some embodiments, the process includes sensing if the viscosity of the foam concentrate has changed by sensing the temperature of the foam concentrate flow. As discussed above, the viscosity of foam concentrates can vary based on the temperature of the foam concentrate. The venturi-principle foam proportioner with the thermo-responsive variable orifice can check if the viscosity of the foam concentrate has changed using the temperature sensed in step 602. Based on the temperature of the foam concentrate, a corresponding viscosity can be found on the temperature-viscosity curve of for the foam concentrate. The thermo-responsive variable orifice is designed in view of the temperature-viscosity curve for the selected foam concentrate such that changes in the temperature of the foam concentrate that indicate significant or material changes in the viscosity of the foam concentrate result in a change in size of the orifice area of the thermo-responsive variable orifice. For example, the thermo-responsive variable orifice can be designed to only adjust the size of the orifice in the thermo-responsive variable orifice at a minimum working temperature. The minimum working temperature of the thermo-responsive variable orifice can be selected based on the temperature-viscosity curve of the foam concentrate.

In some embodiments, if the viscosity of the foam concentrate has increased, the orifice area of the thermo-responsive variable orifice is enlarged (step 606). Depending on the foam concentrate, the viscosity increase can be a result of a temperature increase or a temperature decrease. For example, for a foam concentrate that decreases in viscosity as the temperature increases, the viscosity increases as the temperature decreases. This process is explained above in detail with reference to FIGS. 2 and 3. Relatedly, for a foam concentrate that increases in viscosity as the temperature increase, the viscosity increase is a result of the temperature increase. This process is explained above in detail with reference to FIGS. 4 and 5. In some embodiments, if the viscosity of the foam concentrate has decreased the orifice area of the thermo-responsive variable orifice is reduced (step 608). At both steps 606 and 608 the thermo-responsive variable orifice adjust the size of the orifice area for passing foam concentrate from the foam concentrate supply line to the venturi based on the viscosity of the foam concentrate at the time. The change in the orifice area is proportional to the change in viscosity such that the total flow of foam concentrate out of the thermo-responsive variable orifice is substantially consistent across temperatures and viscosities.

In some embodiments, a finished water/foam mixture is proportioned and deliver to a hazard. The finished water/foam mixture may have a water/foam ratio according to the desired ratio determined at step 502 of the method of FIG. 5. In some embodiments, the finished water/foam mixture is provided to a pump (e.g., an around-the-pump system) before being deliver to hazard.

In some embodiments, the process includes checking if the hazard is extinguished (step 612). If the hazard is not extinguished, process 600 returns back to step 602. Process 600 can cycle through steps 602-612 as described above, where an actuator of thermo-responsive variable orifice is constantly adjusting the orifice area of the thermo-responsive variable orifice based on the temperature (as a proxy for viscosity) of the foam concentrate. In some embodiments, the actuator is a single actuation actuator, and once actuated the actuator can only be retracted and cannot extend further. Further, the size the orifice area can be increased to is limited by a maximum diameter of the orifice area when a plate is covering no portion of the orifice area. In some embodiments, the system 100 can include a multi-stage actuator and/or multiple actuators as part of the thermo-responsive variable orifice and the process 600 can result in multiple actions as it cycles between steps 602-612. If the hazard is extinguished as step 612, the process 600 ends at 614.

Figure 10:
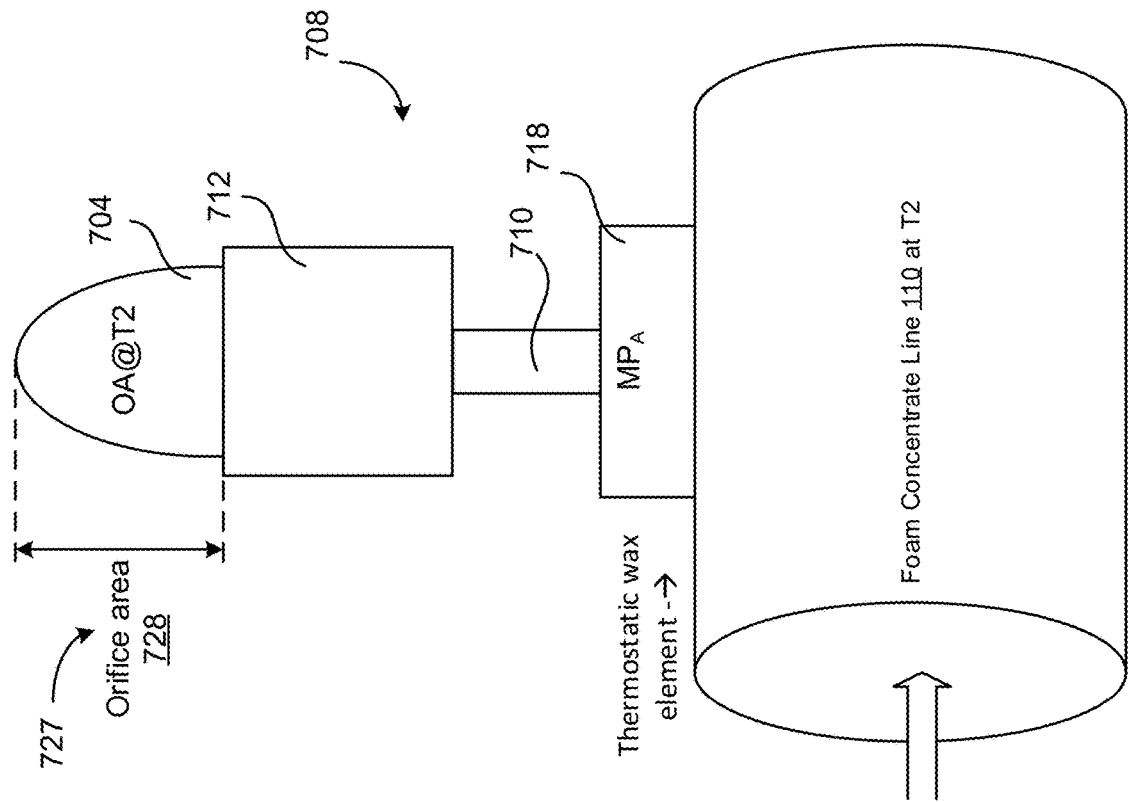
FIGS. 9 and 10 are schematic representations of a portion of a fire suppression system with a thermo-responsive variable orifice foam proportioner, according to another exemplary embodiment.
Figure 9:
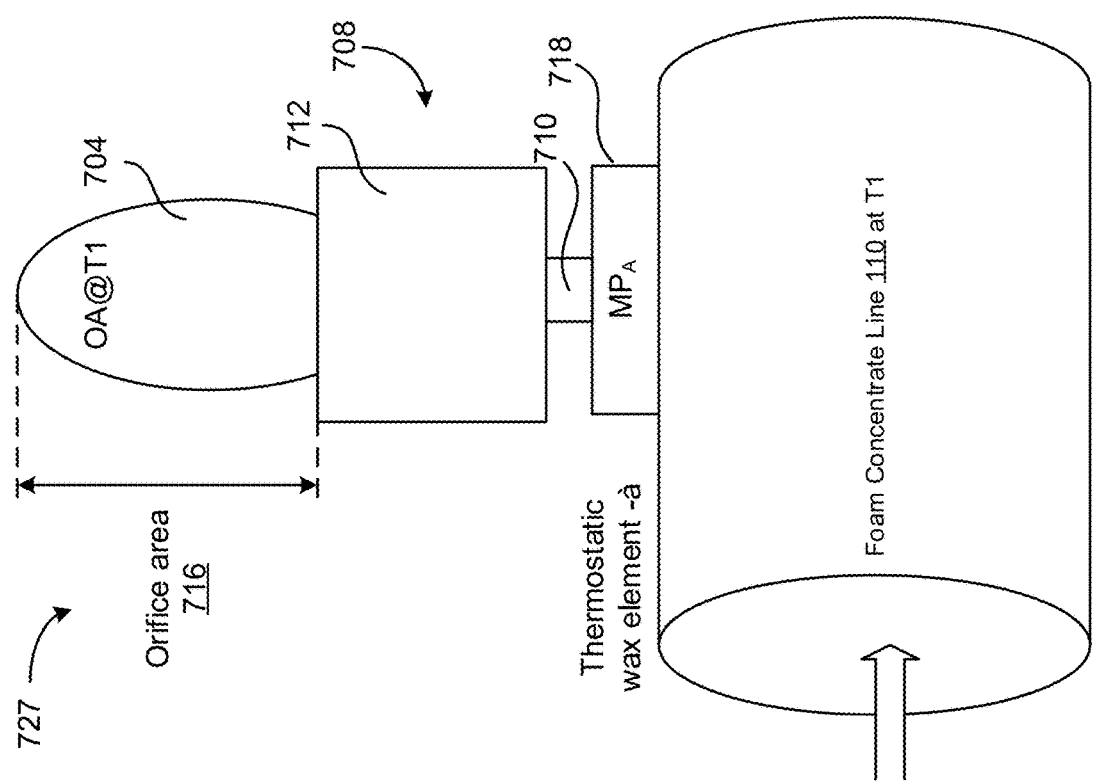

Referring now to FIGS. 9 and 10, schematic representations of a portion of a fire suppression system with a thermo-responsive variable orifice 727 are shown, according to an exemplary embodiment. In various embodiments, elements 704-728 of the thermo-responsive variable orifice 727 are similar or equivalent to elements 204-216 of the thermo-responsive variable orifice 127 in FIGS. 2-3, respectively. As shown the thermo-responsive variable orifice 727 may be configured to be used with foam concentrates that increase in viscosity as the temperature of the foam concentrate decreases.

Referring to FIG. 9, the thermo-responsive variable orifice 727 is shown at a time T1 with the foam concentrate in the foam concentrate line 110 at a first temperature. The foam concentrate flowing through the foam concentrate line 110 flows past the thermal wax element 718 of thermostatic actuator 708. At time T1, the temperature of the concentrate is below the melting point set point $MP_A$ and so the actuator is not actuated. The size of the variable orifice 704 at T1 is therefore orifice area 716.

Referring to FIG. 10, the thermo-responsive variable orifice 727 is shown at a time T2 with the foam concentrate in the foam concentrate line 110 at a second temperature at or above the melting point set point MPA. The foam concentrate flowing past the thermal wax element 718 heats the thermal wax element 718 to and/or above its MPA. The thermal wax element melts and expands, and thermostatic actuator 708 actuates and pushes the piston 710 out from the thermostatic actuator 708 which in turn moves a plate 712 attached to an exposed end of the piston 710 into the variable orifice 704 to reduce the size of the variable orifice 704 to a second orifice area shown as orifice area 728.

Figure 12:
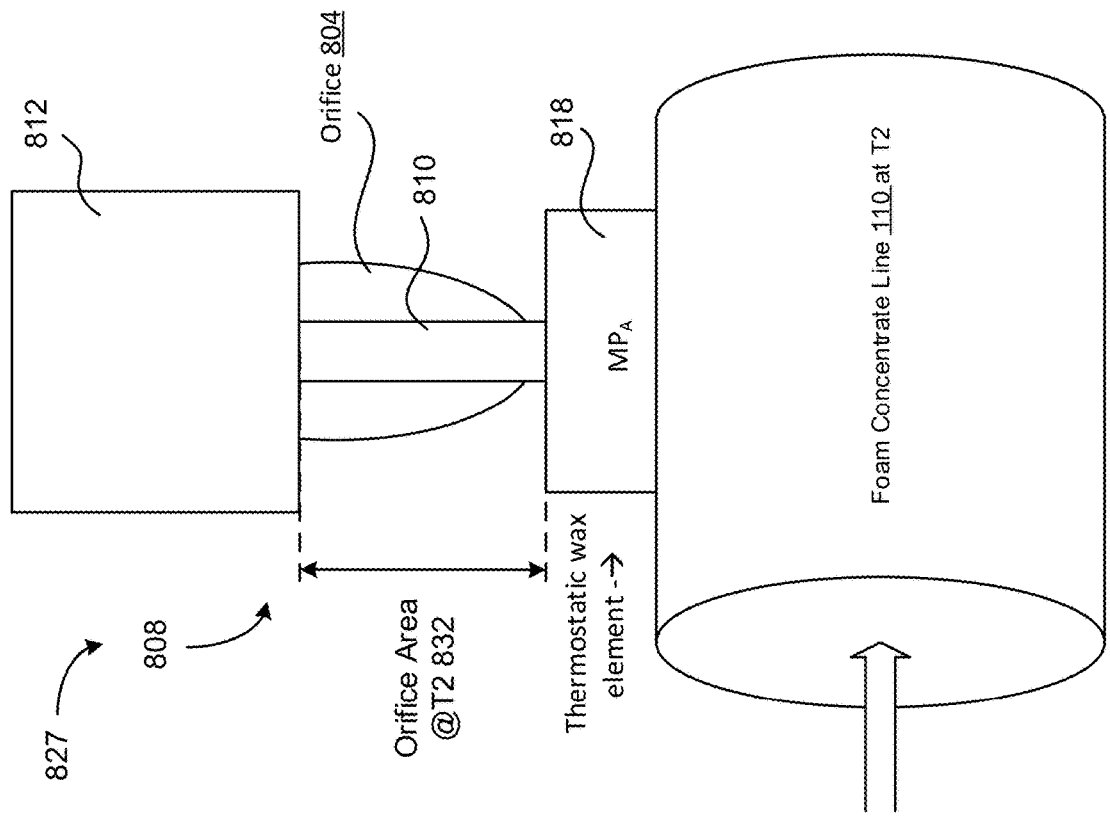
FIGS. 11 and 12 are schematic representations of a portion of a fire suppression system with a thermo-responsive variable orifice foam proportioner, according to an exemplary embodiment.
Figure 11:
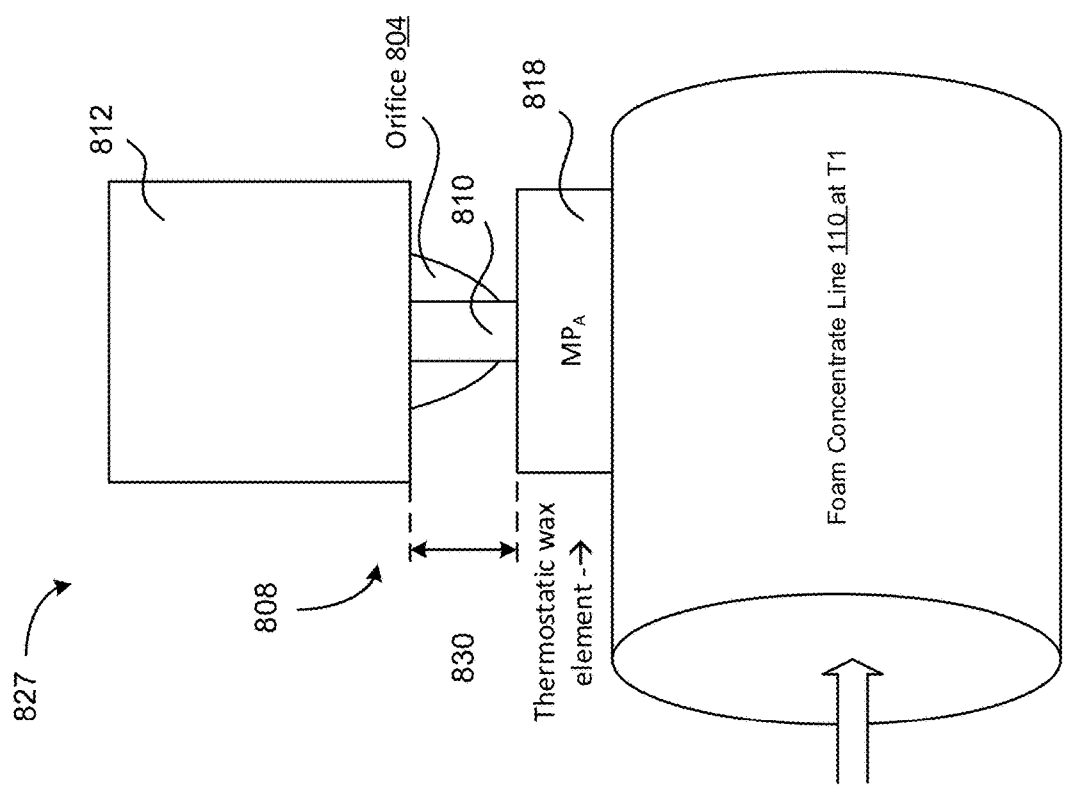

Referring now to FIGS. 11 and 12, schematic representations of a portion of a fire suppression system with a thermo-responsive variable orifice 827 are shown, according to another exemplary embodiment. In various embodiments, elements 804-832 of the thermo-responsive variable orifice 827 are similar or equivalent to elements 204-232 of the thermo-responsive variable orifice 127 in FIGS. 2-3, respectively, and/or similar or equivalent to elements 710-728 of the thermo-responsive variable orifice 727 in FIGS. 9-10. As shown the thermo-responsive variable orifice 827 may be configured to be used with foam concentrates that increase in viscosity as the temperature of the foam concentrate increases.

Referring to FIG. 11, the thermo-responsive variable orifice 827 shown at a time T1 with the foam concentrate in the foam concentrate line 110 at a first temperature. The foam concentrate flowing through the foam concentrate line 110 flows past the thermal wax element 818 of thermostatic actuator 808. At time T1, the temperature of the concentrate is below the melting point set point $MP_A$ and so the actuator is not actuated. The size of the variable orifice 804 at T1 is therefore orifice area 830.

Referring to FIG. 12, the thermo-responsive variable orifice 827 is shown at a time T2 with the foam concentrate in the foam concentrate line 110 at a second temperature at or above the melting point set point $MP_A$. The foam concentrate flowing past the thermal wax element 818 heats the thermal wax element 818 to and/or above its MPA. The thermal wax element melts and expands, and thermostatic actuator 808 actuates and pushes the piston 810 out from the thermostatic actuator 808 which in turn moves a plate 812 attached to an exposed end of the piston 810 into the variable orifice 804 to increase the size of the variable orifice 804 to a second orifice area shown as orifice area 832.

Notwithstanding the embodiments described above in reference to FIGS. 1-12, various modifications and inclusions to those embodiments are contemplated and considered within the scope of the present disclosure. It should be understood that FIGS. 1-12 are for illustrative purposes only and are not intended to be an accurate representation of scale. For example, in some embodiments, foam inlet 202 is the same width as variable orifice 204 (at its maximum width).

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

Some aspects of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein.

What is claimed is:

1. A fire suppression system, the system comprising:
   a water supply;
   a foam concentrate supply;
   a venturi-principle foam proportioner fluidly coupled to each of the water supply and the foam concentrate supply, the venturi-principle foam proportioner configured to proportion a concentration of water and a concentration of foam concentrate within a chamber to form a water and foam solution flowing from an outlet of the venturi-principle foam proportioner; and
   a variable foam concentrate orifice fluidly coupling the foam concentrate supply to the chamber, the variable foam concentrate orifice comprising an actuator configured to adjust an orifice area of the variable foam concentrate orifice based on a temperature associated with the foam concentrate.

2. The system of claim 1, the variable foam concentrate orifice comprising:
   a foam inlet fluidly coupled to the foam concentrate supply; and
   a variable orifice fluidly coupled to the foam inlet;
   wherein the actuator is coupled to a plate, such that the plate is movable by the actuator to adjust a size of the variable orifice, such that when the temperature associated with the foam concentrate is below a minimum working temperature the plate is in a first position and a first orifice area is obtained, and when the temperature associated with the foam concentrate is at or above the minimum working temperature the actuator moves the plate to a second position to adjust the size of the variable orifice and obtain a second orifice area.

3. The system of claim 1, wherein the actuator is a thermostatic actuator thermally coupled to the foam concentrate supply.

4. The system of claim 3, the thermostatic actuator comprising:
   an actuable piston at least partially positioned within a body of the actuator;
   a thermally sensitive material contained by the body of the actuator; and
   a biasing member;
   wherein the thermally sensitive material is configured to expand when the temperature associated with the foam concentrate reaches a minimum working temperature, wherein the actuable piston is acted on by the expansion of the thermally sensitive material when the temperature associated with the foam concentrate is at or above the minimum working temperature and a portion of the actuable piston is pushed out of the body of the actuator, and wherein the biasing member biases the actuable piston in a direction back into the body of the actuator.

5. The system of claim 1, wherein the actuator is an electric actuator.

6. The system of claim 5, the variable foam concentrate orifice further comprising:
   a temperature sensor thermally coupled to the foam concentrate supply to sense the temperature associated with the foam concentrate; and
   wherein the electric actuator is communicably coupled to the temperature sensor and configured to actuate when the temperature associated with the foam concentrate reaches a first temperature.

7. The system of claim 1, wherein the foam concentrate has a viscosity that is correlated with the temperature associated with the foam concentrate, and wherein the actuator is configured to increase the orifice area of the variable foam concentrate orifice as the viscosity of the foam concentrate increases based on the temperature associated with the foam concentrate.

8. The system of claim 7, wherein the viscosity of the foam concentrate increases as the temperature associated with the foam concentrate increases.

9. The system of claim 7, wherein the viscosity of the foam concentrate decreases as the temperature associated with the foam concentrate increases.

10. The system of claim 1, wherein the foam concentrate has a viscosity that is correlated with the temperature associated with the foam concentrate, and wherein the actuator is configured to adjust the orifice area of the variable orifice based on the temperature associated with the foam concentrate.

11. A method for proportioning a foam concentrate in a fire suppression system, the method comprising:
   providing water from a water supply to a venturi-principle foam proportioner;
   providing a foam concentrate from a foam concentrate supply to the venturi-principle foam proportioner, wherein a viscosity of the foam concentrate is correlated with a temperature of the foam concentrate;
   forming, by the venturi-principle foam proportioner, a foam using the water and the foam concentrate according to a desired ratio;
   sensing a temperature associated with the foam concentrate; and
   adjusting, by an actuator, an orifice area of the venturi-principle foam proportioner based on the temperature to maintain the desired ratio.

12. The method of claim 11, wherein the actuator is a thermostatic actuator configured to react to the temperature.

13. The method of claim 11, wherein the actuator comprises a thermally sensitive material, wherein a size of the orifice area is correlated with a thermal expansion of the thermally sensitive material.

14. The method of claim 13, wherein the thermal expansion is based on the temperature associated with the foam concentrate.

15. The method of claim 11, wherein the actuator is an electric actuator, the method further comprising:
   providing a temperature sensor thermally coupled to the foam concentrate supply and electrically coupled to the electric actuator, wherein the temperature sensor is configured to sense the temperature associated with the foam concentrate.

16. A variable orifice device for proportioning foam concentrate, the device comprising:
   an inlet fluidly coupled to a foam concentrate supply;
   an outlet fluidly coupled to a proportioner configured to proportion water and a foam concentrate to form a water and foam solution; and
   a variable orifice fluidly coupling the inlet with the outlet, the variable orifice comprising an actuator configured to adjust a size of a cross-section of the variable orifice based on a temperature of the foam concentrate.

17. The device of claim 16, wherein the actuator is a thermostatic actuator thermally coupled to the foam concentrate.

18. The device of claim 16, wherein the actuator comprises:
   a volume containing a thermally sensitive material; and
   a piston at least partially surrounded by the thermally sensitive material within the volume, wherein thermal expansion of the thermally sensitive material causes movement of the piston relative to the volume.

19. The device of claim 18, wherein the size of the cross-section of the variable orifice is based on a position of the piston.

20. The device of claim 18, wherein the thermally sensitive material is a thermal wax.

* * * * *